(12) United States Patent
Li (10) Patent No.: US 7,724,723 B2
(45) Date of Patent: May 25, 2010

(54) HIGH-THROUGHPUT SCHEDULER WITH INTEGER-BASED ELIGIBLE NUMBER INITIALIZATION

(75) Inventor: Jinhui Li, Macungie, PA (US)

(73) Assignee: Agere Systems Inc., Allentown, PA (US)

( * ) Notice: Subject to any disclaimer, the term of this patent is extended or adjusted under 35 U.S.C. 154(b) by 968 days.

(21) Appl. No.: 11/461,181

(22) Filed: Jul. 31, 2006

(65) Prior Publication Data

US 2008/0025286 A1  Jan. 31, 2008

(51) Int. Cl.
*H04B 7/212* (2006.01)

(52) U.S. Cl. .................. 370/347; 370/395.4; 370/412

(58) Field of Classification Search ................ 370/328, 370/395.4, 395.41–395.43, 411, 412, 468, 370/442, 235, 347
See application file for complete search history.

(56) References Cited

U.S. PATENT DOCUMENTS

| | | | | |
|---|---|---|---|---|
| 7,583,745 | B2* | 9/2009 | Pasanen et al. | ............... 375/267 |
| 2003/0161317 | A1* | 8/2003 | Kramer et al. | ........... 370/395.4 |
| 2005/0111461 | A1 | 5/2005 | Khan et al. | |
| 2006/0026192 | A1 | 2/2006 | Li et al. | |
| 2006/0117054 | A1 | 6/2006 | Li et al. | |
| 2006/0146721 | A1* | 7/2006 | Attar et al. | .................. 370/238 |
| 2007/0202904 | A1* | 8/2007 | Cheng et al. | ................. 455/509 |
| 2008/0019373 | A1* | 1/2008 | Filipovich et al. | ........ 370/395.4 |
| 2008/0056296 | A1* | 3/2008 | Kucuk et al. | ................ 370/442 |
| 2008/0175270 | A1* | 7/2008 | Kataria et al. | ............... 370/468 |

OTHER PUBLICATIONS

A. Jalali et al., "Data Throughput of CDMA-HDR a High Efficiency-High Data Rate Personal Communication Wireless System," Proceedings of IEEE VTC 2000, pp. 1854-1858, May 2000.

S.S. Panwar et al., "Golden Ratio Scheduling for Flow Control with Low Buffer Requirements," IEEE Transactions on Communications, vol. 40, No. 4, pp. 765-772, Apr. 1992.

M. Andrews et al., "Providing Quality of Service Over a Shared Wireless Link," IEEE Communication Magazine, vol. 39, pp. 150-154, Feb. 2001.

U.S. Appl. No. 11/427,476, filed Jun. 29, 2006 Jinhui Li, "Credit-Based Wireless Network Scheduling."

U.S. Appl. No. 11/415,831, filed May 1, 2006 C.W. Hamilton et al., "Wireless Network Scheduling Methods and Apparatus Based on Both Waiting Time and Occupancy."

U.S. Appl. No. 11/415,546, filed May 1, 2006 C.W. Hamilton et al., "High-Throughput Scheduler with Guaranteed Fairness for Wireless Networks and Other Applications."

* cited by examiner

*Primary Examiner*—CongVan Tran
(74) *Attorney, Agent, or Firm*—Ryan, Mason & Lewis, LLP (57) ABSTRACT

A scheduler is adapted to schedule packets or other data blocks for transmission from a plurality of transmission elements in timeslots of a frame in a communication system. In scheduling for a given frame, the scheduler determines eligible numbers for respective ones of the transmission elements that are eligible to transmit one or more data blocks in a given frame. The eligible numbers are initialized using a common designated integer value n, where n is a finite value greater than or equal to two. The scheduler selects from those of the transmission elements having eligible numbers within a particular range at least one of the transmission elements for scheduling in a next available timeslot. The scheduler then adjusts the eligible number(s) of the selected transmission element(s), and repeats the selecting and adjusting operations for one or more remaining timeslots of the given frame. The scheduler in an illustrative embodiment may be implemented in a network processor integrated circuit or other processing device of the communication system.

20 Claims, 5 Drawing Sheets

HIGH-THROUGHPUT SCHEDULER WITH INTEGER-BASED ELIGIBLE NUMBER INITIALIZATION

RELATED APPLICATIONS

The present application is related to U.S. patent application Ser. No. 11/415,831, filed May 1, 2006 and entitled "Wireless Network Scheduling Methods and Apparatus Based on Both Waiting Time and Occupancy," Ser. No. 11/415,546, filed May 1, 2006 and entitled "High-Throughput Scheduler with Guaranteed Fairness for Wireless Networks and Other Applications," and Ser. No. 11/427,476, filed Jun. 29, 2006 and entitled "Credit-Based Wireless Network Scheduling," the disclosures of which are incorporated by reference herein.

FIELD OF THE INVENTION

The present invention relates generally to the field of telecommunications, and more particularly to schedulers used to control access to limited resources.

BACKGROUND OF THE INVENTION

In many telecommunications applications, a scheduler is used to resolve contention among multiple tasks competing for a limited resource. For example, such a scheduler is commonly used in a network processor to schedule multiple traffic flows for transmission over a specific transmission bandwidth.

A network processor generally controls the flow of data between a physical transmission medium, such as a physical layer portion of a network, and a switch fabric in a router or other type of switch. An important function of a network processor involves the scheduling of cells, packets or other data blocks, associated with the multiple traffic flows, for transmission to the switch fabric from the physical transmission medium of the network and vice versa. The network processor scheduler performs this function.

An efficient and flexible scheduler architecture capable of supporting multiple scheduling algorithms is disclosed in U.S. patent application Ser. No. 10/722,933, filed Nov. 26, 2003 in the name of inventors Asif Q. Khan et al. and entitled "Processor with Scheduler Architecture Supporting Multiple Distinct Scheduling Algorithms," which is commonly assigned herewith and incorporated by reference herein.

It is often desirable for a given scheduling algorithm implemented in a network processor or other processing device to be both simple and fair. Simplicity is important because processing device hardware typically does not have a large amount of time to make a given scheduling decision, particularly in a high data rate environment. A good scheduler should also be fair. For example, it may allocate the bandwidth according to the weights of the users, with the higher-priority users getting more bandwidth than lower-priority users.

An example of a simple and fair scheduling algorithm is the Weighted Round-Robin (WRR) scheduling algorithm. Assume that in a given telecommunications application there is a number of users competing for one resource, which can process one data block in each timeslot. The scheduler must decide which user can send one data block to the server in each timeslot. Each user has a weight to indicate its priority. The user with larger weight has higher priority. Under ideal conditions, the services received by the users should be proportional to their weights. A WRR scheduler serves the users in proportion to their weights in a round-robin fashion.

A problem with WRR is that it may cause long periods of burstiness. This is clearly not desirable in telecommunication systems, because long burstiness could overflow the buffers of user communication devices. Such burstiness becomes increasingly problematic in those practical applications in which the total number of users may be several hundreds or more.

Alternative scheduling algorithms are known which overcome the burstiness problem of WRR. These include, by way of example, Weighted Fair Queuing (WFQ) and Worst-case Fair Weighted Fair Queueing ($WF^2Q$). Unfortunately, these alternative algorithms are typically considerably more complex than WRR, and therefore may be difficult to implement in network processors and other processing devices operating in high data rate environments.

U.S. patent application Ser. No. 10/903,954, filed Jul. 30, 2004 in the name of inventors Jinhui Li et al. and entitled "Frame Mapping Scheduler," which is commonly assigned herewith and incorporated by reference herein, discloses in an illustrative embodiment a frame mapping scheduler that provides simplicity and fairness comparable to that of WRR, but without the burstiness problem commonly associated with WRR. More specifically, a frame mapping scheduler in the illustrative embodiment described therein comprises scheduling circuitry which utilizes a weight table and a mapping table. The weight table comprises a plurality of entries, with each of the entries identifying a particular one of the transmission elements. The mapping table comprises at least one entry specifying a mapping between a particular timeslot of a frame and an entry of the weight table. The scheduling circuitry determines a particular transmission element to be scheduled in a given timeslot by accessing a corresponding mapping table entry and utilizing a resultant value to access the weight table. The mapping table entries may be predetermined in accordance with a golden ratio policy, or other type of policy.

However, in schedulers which utilize a golden ratio policy, or more generally any policy that requires a stored mapping table, the mapping table may be large and therefore require substantial amounts of memory. It is usually preferred that such mapping table memory be arranged "on-chip," that is, on the same integrated circuit as the scheduler, so as to reduce access times. For example, such an arrangement is beneficial in network processing applications in which data blocks may need to be processed substantially in real time.

U.S. patent application Ser. No. 10/998,686, filed Nov. 29, 2004 in the name of inventors Jinhui Li et al. and entitled "Frame Mapping Scheduler with Compressed Mapping Table," discloses techniques for compressing the mapping table in order to reduce the amount of memory required to store the table, thereby facilitating its implementation in a network processor integrated circuit or other device comprising a frame mapping scheduler.

The known arrangements described above can be utilized in a wide variety of telecommunications applications, including applications involving wireless networks. However, scheduling in the wireless network context can be particularly challenging because channel capacities in a wireless network are typically time varying and difficult to predict. It is important in such situations that the wireless network scheduler provides not only fairness, but also sufficient throughput.

Examples of scheduling algorithms utilized in the wireless network context include the above-described WRR scheduling algorithm and its unweighted counterpart round robin (RR), maximum carrier-to-interference ratio (Max C/I), Proportional Fairness (PF) and Modified Largest Weighted Delay First (M-LWDF).

A drawback of the RR scheduling algorithm is that it does not consider the channel conditions. Instead, the RR scheduling algorithm simply schedules backlogged users one by one, with the first user being assigned to the first timeslot, the second user being assigned to the second timeslot, and so on, regardless of their respective channel capacities. Such an approach is fair, because in a given set of N timeslots, each of N users has exactly one chance to be served. However, the throughput of the RR algorithm is poor, because it does not check the channel capacities before it makes the scheduling decisions. The WRR scheduling algorithm similarly fails to take channel capacities into account in its scheduling decisions.

The Max C/I scheduling algorithm selects for a given timeslot the user that has the best channel capacity. Although this approach can achieve the maximum overall throughput, its fairness performance is very poor. For example, if the wireless link of a given mobile user is constantly weak, that user is not likely to be scheduled.

The PF scheduling algorithm selects the user that has the maximum $r_i/R_i$, where $r_i$ is the channel capacity of user i and $R_i$ is the average rate received by user i. The algorithm updates $R_i$ adaptively. Thus, mobile users with weak wireless links will have opportunities to be scheduled. Additional details regarding the PF scheduling algorithm can be found in, for example, A. Jalali et al., "Data throughput of CDMA-HDR a high efficiency high data rate personal communication wireless system," in Proc. of IEEE VTC 2000, pp. 1854-1858, May 2000. The fairness of the PF scheduling algorithm is better than that of the Max C/I scheduling algorithm, but not as good as that of the RR or WRR scheduling algorithms. Also, the PF scheduling algorithm cannot provide guaranteed fairness.

The M-LWDF scheduling algorithm gives higher priorities to the users that have longer waiting times. However, like the above-described PF scheduling algorithm, it fails to provide guaranteed fairness.

Accordingly, the Max C/I, PP and M-LWDF scheduling algorithms provide better throughput than the RR and WRR scheduling algorithms in the wireless context by sacrificing fairness.

The above-cited U.S. patent application Ser. No. 11/415,546 provides improved scheduling algorithms which exhibit a better balance between throughput and fairness, particularly in wireless network applications. In an illustrative embodiment, the algorithm is referred to as a Wireless RR (WiRR) scheduling algorithm. In this embodiment, all transmission elements are initially designated as eligible for service in a given frame, but once a particular transmission element is served in a timeslot of the given frame, it is considered ineligible for service in any subsequent timeslots of that frame. The process is repeated for additional frames, and for each new frame the transmission elements are all initially designated as eligible to transmit one or more data blocks in that frame.

Further improvements are provided in the above-cited U.S. patent application Ser. No. 11/415,831, which overcomes certain disadvantages of the conventional M-LWDF scheduling algorithm. For example, the M-LWDF algorithm generally has a queue length which, although bounded under admissible arrivals, may be quite large, and therefore the queues may be difficult to implement in network processor integrated circuits or other types of hardware. The cited application discloses scheduling algorithms that can be implemented using shorter queues, and thus with reduced amounts of memory and other hardware resources, relative to conventional scheduling algorithms such as M-LWDF.

Despite these advances, a need remains for further improvements in scheduling algorithms, particularly in the wireless context. For example, although WiRR has guaranteed fairness and higher throughput than RR, it would be desirable if techniques were available that could further enhance the throughput of WiRR and similar scheduling algorithms.

SUMMARY OF THE INVENTION

The present invention in one or more illustrative embodiments provides wireless scheduling algorithms that improve the throughput of the above-noted WiRR scheduling algorithm.

In accordance with one aspect of the invention, a scheduler is adapted to schedule packets or other data blocks for transmission from a plurality of transmission elements in timeslots of a frame in a communication system. In scheduling for a given frame, the scheduler determines eligible numbers for respective ones of the transmission elements that are eligible to transmit one or more data blocks in a given frame. The eligible numbers are initialized using a common designated integer value n, where n is a finite value greater than or equal to two. The scheduler selects from those of the transmission elements having eligible numbers within a particular range at least one of the transmission elements for scheduling in a next available timeslot. The scheduler then adjusts the eligible number(s) of the selected transmission element(s), and repeats the selecting and adjusting operations for one or more remaining timeslots of the given frame.

A first illustrative embodiment provides a modified RR scheduling algorithm also referred to herein as an n-Wireless RR (n-WiRR) scheduling algorithm. In this embodiment, user i of N eligible users has eligible number $e_i$, where i=1, 2, ... N. The eligible numbers $e_i$ for all of the N eligible users in this embodiment are initialized by setting them equal to the integer value n, that is, by setting $e_i = n$ for all i. In this particular embodiment, whenever a user is served, its eligible number decreases by one. When the eligible number reaches zero, that user is ineligible for any further consideration in the given frame.

A second illustrative embodiment provides a weighted version of the n-WiRR scheduling algorithm. In this embodiment, the users are assigned weights, with the weight assigned to user i being denoted $w_i$. Also associated with each of the users is an eligible number, as in the first embodiment above, with the eligible number for user i again being denoted $e_i$. The eligible numbers $e_i$ for all of the N eligible users in this embodiment are initialized by setting them equal to the respective products of n and the respective weights $w_i$, that is, by setting $e_i = n \cdot w_i$, for all i. Also as in the previous embodiment, whenever a user is served, its eligible number decreases by one, and when the eligible number reaches zero, that user is ineligible for any further consideration in the given frame.

The scheduler in an illustrative embodiment may be implemented in a network processor integrated circuit or other processing device of the communication system, using a wide variety of different arrangements of scheduling circuitry.

DETAILED DESCRIPTION OF THE INVENTION

The invention will be illustrated herein in conjunction with exemplary wireless networks and other types of communication systems. The exemplary systems include respective schedulers configured in a particular manner in order to illustrate the techniques of the invention. It should be understood, however, that the invention is more generally applicable to any communication system scheduler in which it is desirable to provide improved throughput.

Figure 1:
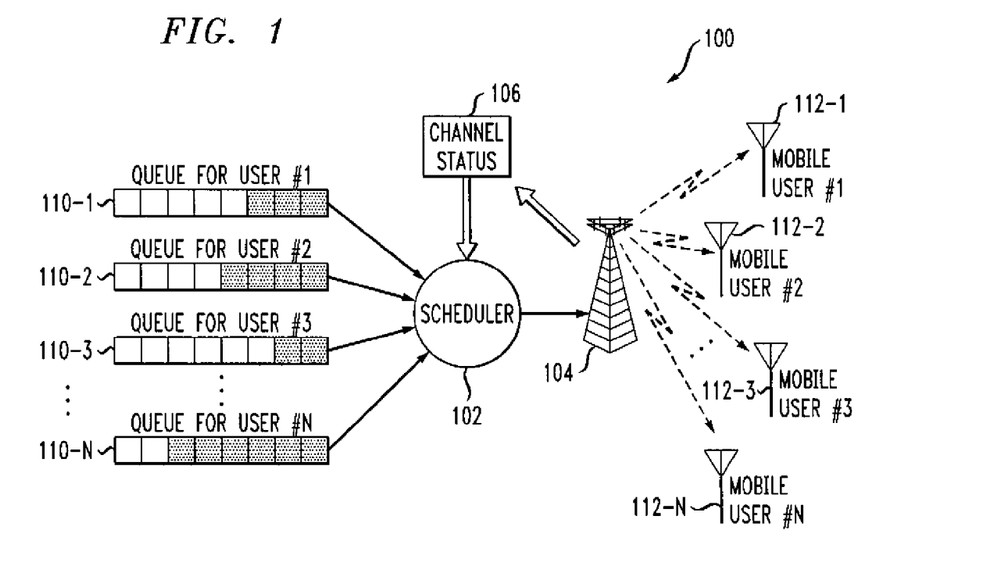
FIG. 1 is a simplified block diagram of a communication system comprising a wireless network in an illustrative embodiment of the present invention.

FIG. 1 shows a simplified diagram of a communication system 100 in accordance with an illustrative embodiment of the invention. The system 100 comprises a scheduler 102 coupled to a transmitter 104 and a channel status element 106. The scheduler is coupled to transmission elements which in this embodiment comprise respective queues 110-1, 110-2, . . . 110-N for respective ones of N users. In this example, the N users are mobile users of a wireless network of the system 100, and are associated with respective mobile user devices 112-1, 112-2, . . . 112-N which communicate with transmitter 104 in a conventional manner. The transmitter 104 may comprise, for example, at least a portion of a base station or access point of the wireless network.

The wireless network is configured for communication of packets or other arrangements of data between transmitter 104 and the mobile user devices 112. All such arrangements of data are intended to be encompassed by the general term "data block" as used herein. It is to be appreciated that the invention does not require any particular size or configuration of data blocks. For simplicity and clarity of illustration, the diagram shows only the downlink communication between transmitter 104 and the mobile user devices 112, although it is to be appreciated that similar techniques may be used for other types of transmission.

The system 100 in this embodiment maintains one queue 110 for each mobile user 112, although other types of queuing arrangements may be used. Downlink transmissions are assumed to occur in timeslots of a frame. During each timeslot, the scheduler 102 serves one or more of the users. The scheduler in this embodiment is assumed to have knowledge of the wireless channel capacities associated with the respective mobile users. This knowledge may be provided to the scheduler by the channel status element 106, or using other techniques. As indicated previously, the channel capacities associated with the mobile users are typically time varying and difficult to predict. The scheduler bases its scheduling decisions on the actual measured channel conditions and other parameters, as will be described in greater detail below in conjunction with FIGS. 3 through 5. For a given timeslot, the scheduler selects one or more of the user queues 110 which will each be scheduled to transmit a packet during that timeslot. A given packet is transmitted via transmitter 104 to the corresponding one of the mobile user devices 112.

Figure 2:
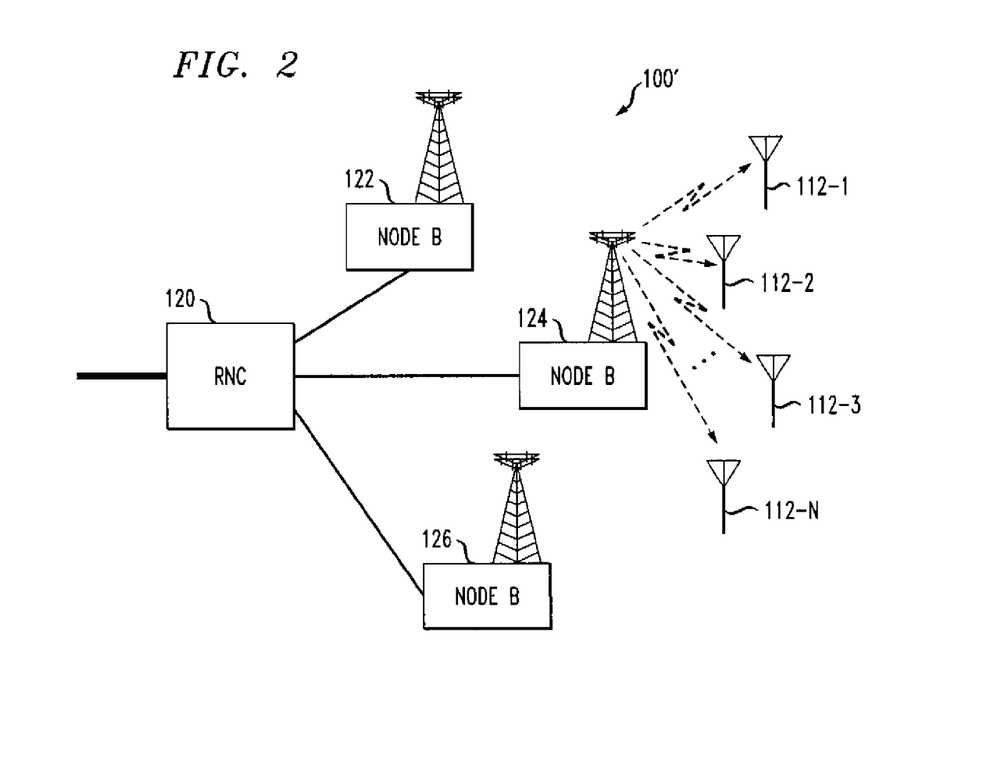
FIG. 2 shows one possible implementation of at least a portion of the communication system of FIG. 1.

The system 100 of FIG. 1 may be implemented, for example, as an otherwise conventional Universal Mobile Telecommunications System (UMTS) or Wideband Code Division Multiple Access (WCDMA) wireless cellular communication system. In such an implementation, system 100' as shown in FIG. 2 comprises a radio network controller (RNC) 120 coupled to base stations 122, 124 and 126 as shown. The base stations 122, 124 and 126 are referred to as Node B elements in accordance with well-known UMTS and WCDMA nomenclature. These elements communicate with the mobile user devices 112, which are referred to as user equipment (UE) elements in the UMTS and WCDMA context. The scheduler 102 and channel status element 106 of the FIG. 1 system may be incorporated in the RNC 120, or may be replicated in each of the Node B elements 122, 124 and 126. For example, if the UMTS or WCDMA system 100 is configured to provide high speed downlink packet access (HSDPA) capability, a scheduler is typically arranged in each Node B element so as to permit fast scheduling.

The above-noted HSDPA capability uses timeslots referred to as transmission time intervals (TTIs), and one or more users can be served within each TTI. The HSDPA feature can be provided in a frequency division duplex (FDD) mode or a time division duplex (TDD) mode. In the FDD mode, a given TTI has a duration of 2 milliseconds (ms), while in the TDD mode, a given TTI could be 5 ms or 10 ms. These and other TTIs are intended to be encompassed by the general term "timeslot" as used herein.

In the UMTS or WCDMA context, the communication system channel typically used in HSDPA to send data to the UEs from a given Node B is referred to as the high speed downlink shared channel (HS-DSCH).

For simplicity and clarity of illustration, the scheduler 102 as described below will be assumed to serve a single user per timeslot, but it should be understood that the described techniques can be extended in a straightforward manner to accommodate HSDPA and other arrangements in which multiple users can be scheduled in a single timeslot.

It should also be pointed out that the particular arrangements of elements shown in FIGS. 1 and 2 are by way of illustrative example only. More specifically, as previously noted, the invention can be implemented in any type of wireless network or other communication system, and is not limited to any particular communication application.

The scheduler 102 is configured to schedule packets or other data blocks for transmission from the user queues 110 in timeslots of one or more frames. In scheduling for a given frame, the scheduler determines eligible numbers for respective ones of the user queues 110 that are eligible to transmit one or more data blocks in a given frame. The eligible numbers are initialized using a common designated integer value n, where n is finite and greater than or equal to two. The scheduler selects from those of the user queues having eligible numbers within a particular range at least one of the transmission elements for scheduling in a next available timeslot. The scheduler then adjusts the eligible number(s) of the selected user queue(s), and repeats the selecting and adjusting operations for one or more remaining timeslots of the given frame.

A more particular example of such a scheduling algorithm, referred to herein as a modified RR or n-Wireless RR (n-WiRR) scheduling algorithm, will be described below in conjunction with the flow diagram of FIG. 3 and the throughput plot of FIG. 4. In this example, whenever a user is served, its eligible number decreases by one. When the eligible number reaches zero, that user is ineligible for any further consideration in the given frame. A corresponding weighted version of the n-WiRR scheduling algorithm, representing a type of modified WRR scheduling algorithm, will then be described with reference to the flow diagram of FIG. 5.

The scheduler 102 may be implemented at least in part in the form of an integrated circuit, as will be described in greater detail below. Such an integrated circuit may comprise a network processor or other type of processor or processing device that is implemented in a given communication system element, such as a base station or access point associated with transmitter 104 in the FIG. 1 system, or an RNC or Node B element in the FIG. 2 system.

The scheduler 102 may be, for example, a frame mapping scheduler, of the type described in the above-cited U.S. patent application Ser. Nos. 10/903,954 and 10/998,686. The use of these techniques can substantially reduce the amount of memory required to store a mapping table for a golden ratio policy or any other policy that requires a stored mapping table.

It should be noted that the scheduling techniques of the present invention may also or alternatively be used in conjunction with a flexible scheduler architecture capable of supporting multiple scheduling algorithms, such as that disclosed in the above-cited U.S. patent application Ser. No. 10/722,933.

Figure 3:
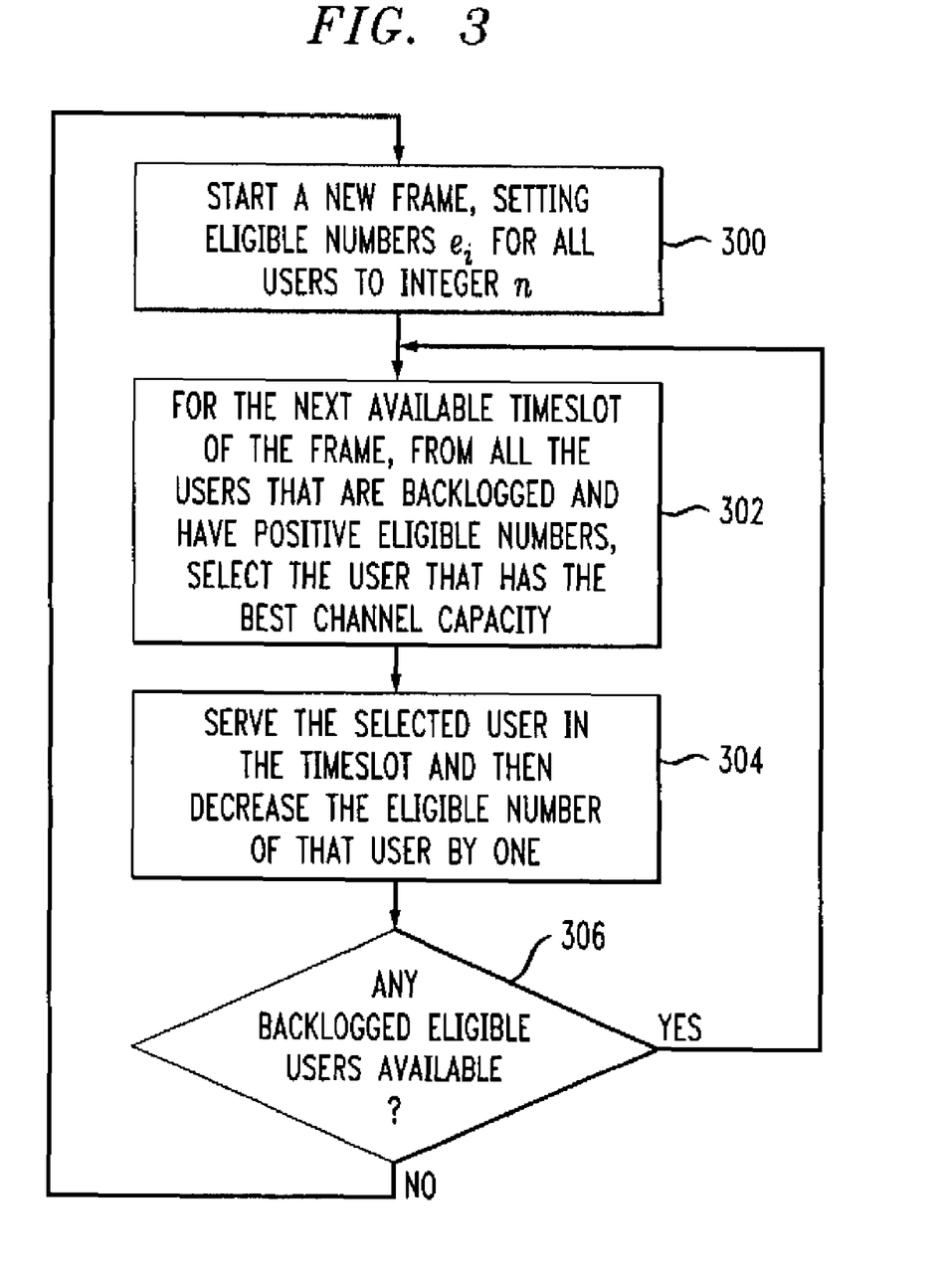
FIG. 3 is a flow diagram of an n-WiRR scheduling algorithm implemented in a scheduler of the FIG. 1 communication system in one embodiment of the present invention.
Figure 4:
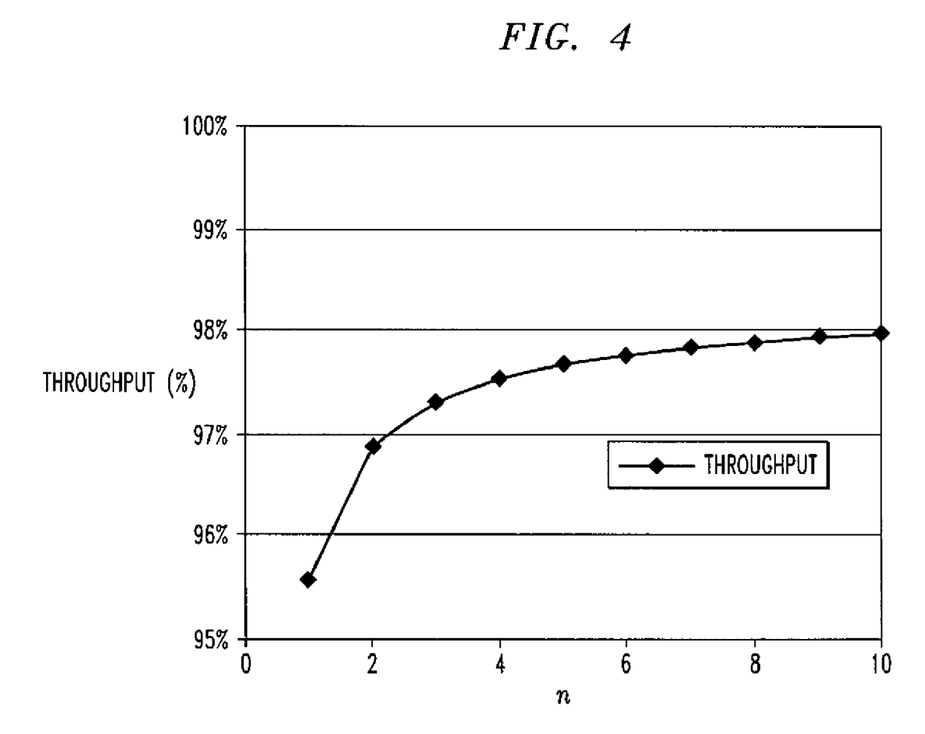
FIG. 4 is a graphical plot of throughput as a function of integer n in the n-WiRR scheduling algorithm of FIG. 3.

Referring now to FIG. 3, the operation of the n-WiRR scheduling algorithm, as implemented by scheduler 102 in system 100 of FIG. 1, is shown. This scheduling algorithm can provide better throughput than the above-noted WiRR scheduling algorithm.

In step 300, the scheduling process begins for a new frame. At this point, all N users are initially designated as being eligible to transmit a packet in that frame. The users have respective eligible numbers which are initialized using a common integer value n. More specifically, in this embodiment user i has eligible number $e_i$, where, as indicated previously herein, i=1, 2, ... N. The eligible numbers $e_i$ for all of the N eligible users in this embodiment are initialized by setting them equal to the integer value n, that is, $e_i$=n for all i. Other embodiments of the invention, such as the weighted version of the n-WiRR scheduling algorithm to be described in conjunction with FIG. 5, use other types of techniques for initializing the eligible numbers using the common integer value n. Those skilled in the art will recognize that a wide variety of alternative initialization techniques based on the common integer value n can be used in place of the illustrative FIG. 3 and FIG. 5 techniques.

In step 302 of FIG. 3, for the next available timeslot of the frame, the scheduler 102 selects from among all the users that are backlogged and have positive eligible numbers $e_i$, the user that has the best channel capacity. Users are assumed to be backlogged if they have at least one packet to transmit. With reference to the diagram of FIG. 1, it can be seen that each of the users illustrated, namely, users 1, 2, 3 and N, is backlogged in that each has at least one packet in its associated queue. Users that are not backlogged in the current timeslot may be removed from consideration in the scheduling process for that timeslot, as will be appreciated by those skilled in the art. However, users that are not backlogged in the current timeslot may become backlogged in the next timeslot, and so removing such users from consideration in scheduling the current timeslot should not be construed as removing them from consideration for the remainder of the frame.

The "best" channel capacity referred to in step 302 is generally assumed to be the highest channel capacity of the backlogged and eligible users, although a wide variety of measures may be used to select from among the backlogged and eligible users, as will be described in greater detail below.

The use of positive eligible numbers to identify the backlogged users from which selection is made should be viewed as one example of an arrangement involving selection from those of the user queues having eligible numbers within a particular range. In other words, the set of positive eligible numbers is considered one example of a particular range of eligible numbers. Other types of ranges of eligible numbers may be used to define a set of users from which one or more users will be selected.

In step 304, the selected user is served in the available timeslot and the eligible number of that user is then decreased by one, that is, the eligible number is adjusted by computing $e_i=e_i-1$. The selected user is "served" in this example by scheduling a packet from the corresponding user queue 110 for transmission in the available timeslot. Other types of eligible number adjustment may be used in other embodiments.

In step 306, a determination is made as to whether any further backlogged and eligible users are available for scheduling. For the present example, as indicated above, eligible users are users having positive eligible numbers. If no such backlogged and eligible users are available, the process returns to step 300 and begins again for a new frame. At this point all users again have their respective eligible numbers initialized to n, that is, $e_i$=n for all i. However, if step 306 determines that there are additional backlogged eligible users, the process returns to step 302 to schedule one or more of those users in additional timeslots of the current frame.

As mentioned previously, there are many different ways to define the "best" channel capacity for purposes of selection in step 302. For example, the best channel capacity may be the best absolute capacity or the best relative capacity, where again "best" generally denotes "highest." Absolute capacity, $r_i$, is the channel capacity to user i, measured in bits per second. Relative capacity can be defined as $r_i/\bar{r}_i$, where $\bar{r}_i$ is the average channel capacity of user i. Alternatively, the relative capacity may be defined as $r_i/R_i$, where $R_i$ is the average rate received by user i, similar to the definition used in the PF scheduling algorithm described previously. The averages $\bar{r}_i$ and $R_i$ can be updated adaptively. When two or more users have the same channel capacity, the tie can be broken randomly, or the user with the smaller index i can be selected.

Another technique for dealing with such ties, suitable for use in the above-noted HSDPA context or other contexts in which multiple users can be served in a given timeslot, is to serve the users simultaneously in the given timeslot. Techniques for scheduling multiple users in a given timeslot via assignment of different HSDPA codes to those users are described in the above-cited U.S. patent application Ser. No. 11/415,831.

The n-WiRR scheduling algorithm illustrated in FIG. 3 may be viewed as a superset of both WiRR as described in the above-cited U.S. patent application Ser. No. 11/415,546 and conventional Max C/I as previously described herein. More specifically, for a value of n=1, the n-WiRR scheduling algorithm reduces to WiRR, and for a value of n=∞, the n-WiRR scheduling algorithm reduces to Max C/I. The illustrative embodiments described herein utilize values of n that are finite and greater than or equal to two.

Advantageously, the FIG. 3 wireless scheduling algorithm can provide enhanced throughput relative to WiRR. A simulation performed on the above-described n-WiRR scheduling algorithm indicates that its throughput performance in the FIG. 3 embodiment varies with n in the manner shown in the plot of FIG. 4.

In the simulation, there were 50 mobile users, that is, N=50. The channel capacities of the users were assumed to be uncorrelated random processes with uniform distributions. It was also assumed that all of the users were always backlogged. The simulation results in terms of throughput performance for n-WiRR are shown in TABLE 1 below. The throughput values are plotted as a function of n in FIG. 4. It can be seen that each of the plotted values of n between two and ten as shown in the figure results in an improvement in throughput relative to WiRR, which in a similar simulation described in the above-cited U.S. patent application Ser. No. 11/415,546 was determined to have a throughput of approximately 95.6%. The 95.6% throughput value is shown in the table adjacent the value of n=1.

These simulation results clearly indicate that n-WiRR with values of n greater than or equal to two achieves higher throughput than WiRR. The throughput increases with increasing values of n, but the price paid for larger n is higher burstiness. Accordingly, it may be preferred in certain applications to use relatively low values of n, such as values which are less than or equal to four, so as to limit the increase in burstiness. For these low values of n, it is expected that burstiness will not be a significant issue.

TABLE 1

Throughput Performance of n-WiRR as a Function of n

| N | Throughput |
|---|---|
| 1 | 95.57% |
| 2 | 96.88% |
| 3 | 97.31% |
| 4 | 97.54% |
| 5 | 97.69% |
| 6 | 97.77% |
| 7 | 97.84% |
| 8 | 97.89% |
| 9 | 97.95% |
| 10 | 97.98% |

Figure 5:
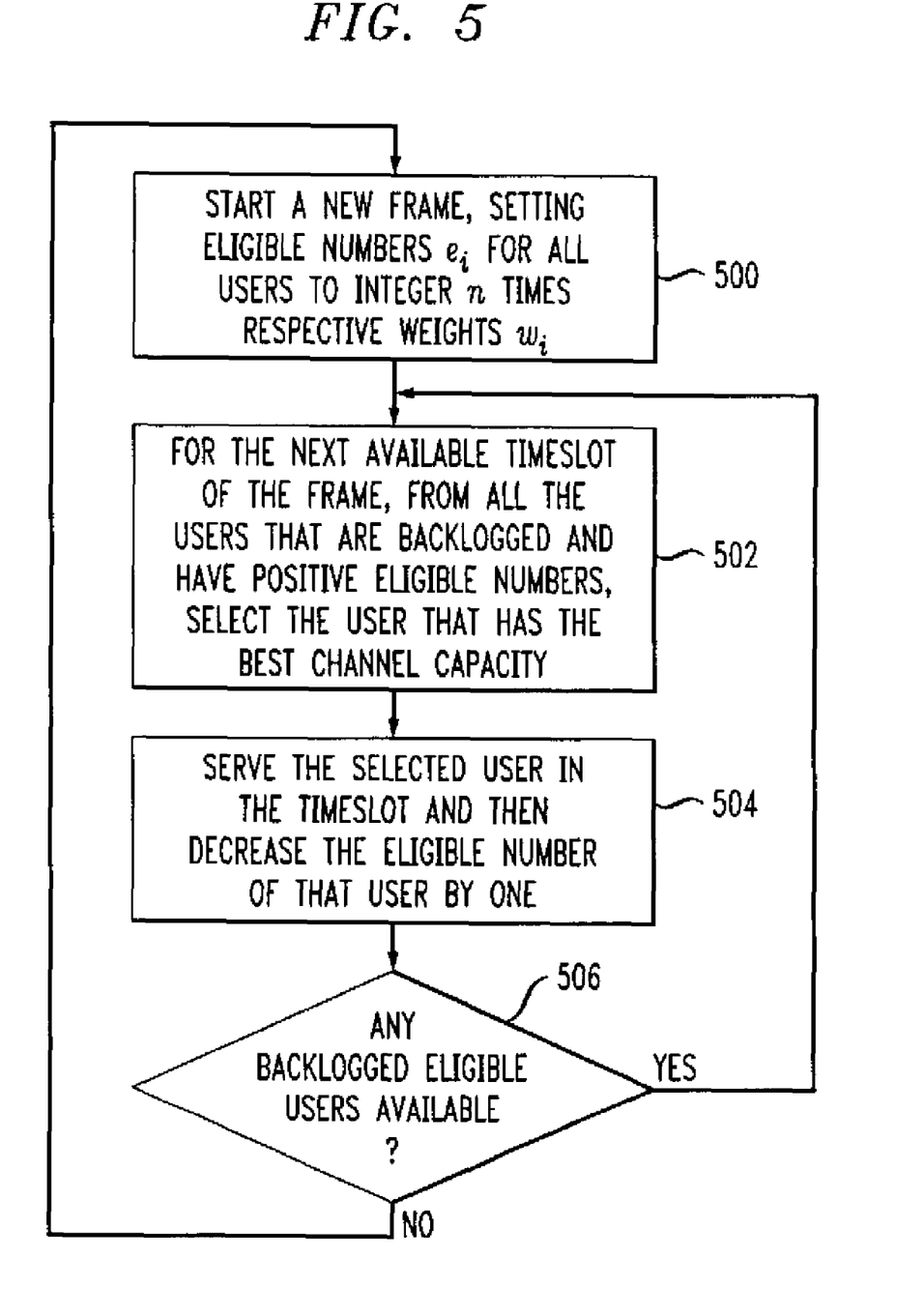
FIG. 5 is a flow diagram of a weighted version of an n-WiRR scheduling algorithm implemented in a scheduler of the FIG. 1 communication system in another embodiment of the present invention.

A weighted version of the n-WiRR scheduling algorithm will now be described with reference to the flow diagram of FIG. 5. It is assumed for this example that all of the users are assigned weights that are positive integers, although other types of weights can be used in other embodiments. The weight assigned to user i is denoted $w_i$. Also associated with each of the users is an eligible number, as in the FIG. 3 example previously described, with the eligible number for user i again being denoted $e_i$. At the beginning of the scheduling process for a given frame, we set $e_i$ to the product of n and $w_i$, that is, $e_i = n \cdot w_i$, for all i. Also as in the FIG. 3 example, whenever a user is served, its eligible number decreases by one, and when the eligible number reaches zero, that user is ineligible for any further consideration in the given frame.

In step 500, the scheduling process begins for a new frame. At this point, all N users are initially designated as being eligible to transmit a packet in that frame. As noted above, their respective eligible numbers $e_i$ are initially set to the respective products of n and their respective weights $w_i$, for all i.

In step 502, for the next available timeslot of the frame, the scheduler 102 selects from among all the users that are backlogged and have positive eligible numbers, the user that has the best channel capacity.

In step 504, the selected user is served in the available timeslot and the eligibility status of that user is then adjusted. The selected user is "served" in this example by scheduling a packet from the corresponding user queue 110 for transmission in the available timeslot. The eligibility status of the selected user is adjusted in this embodiment by decreasing the eligible number of the selected user by one. That is, if user i is scheduled in this slot, the eligible number $e_i$ of that user is updated by computing $e_i = e_i - 1$, as in the FIG. 3 example.

In step 506, a determination is made as to whether any further backlogged and eligible users are available for scheduling. If not, the process returns to step 500, at which point all users again have their eligible numbers set to the respective products of n and their respective assigned weights without regard to their previous selection, and the process begins again for a new frame. However, if there are additional backlogged eligible users, the process returns to step 502 to schedule one or more of those users in additional timeslots of the current frame.

Again, the selection step can use any of a number of different measures, including by way of example, highest absolute capacity or relative capacity. The relative capacity can be defined as $r_i/\bar{r}_i$ or $w_i r_i/R_i$, where as noted above $\bar{r}_i$ is the average channel capacity of user i, and $R_i$ is the average rate received by user i.

It is expected that the throughput and burstiness of the weighted version of n-WiRR as described above will also increase with increasing values of n, as in the unweighted version.

In a typical wireless network, mobile users are frequently removed from or added to a network or a particular cell or other coverage area of the network. The scheduler 102 may be configured to handle users removed or added during a given frame. For users that are removed, the scheduler can simply designate those users as ineligible or otherwise eliminate the users from consideration in the scheduling process. For new users that are added, the scheduler can, by way of example, wait until a new frame starts, or set the eligible number of the new user proportionally, randomly or using other techniques.

As indicated previously, the scheduling algorithms described herein can be implemented in many other types of communication systems. Another example system will now be described with reference to FIGS. 6 through 8. In these figures, a scheduling algorithm is implemented in a scheduler of a network processor. Such a network processor may be used in systems comprising wireless networks as shown in FIGS. 1 and 2, but can also be used in other types of systems, such as the communication system 600 shown in FIG. 6.

Figure 6:
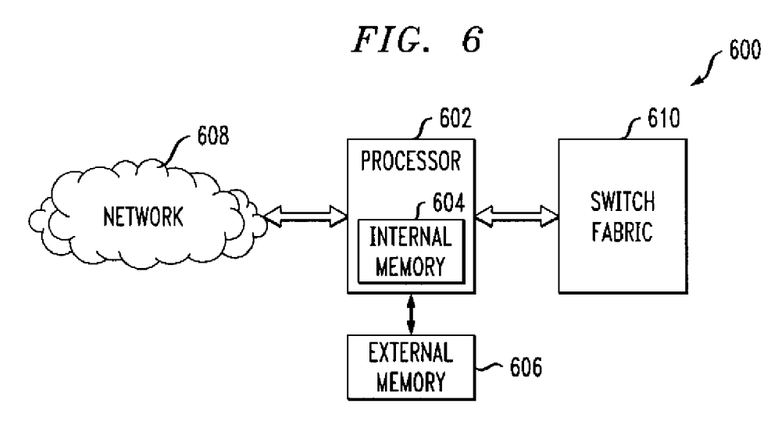
FIG. 6 shows another possible implementation of at least a portion of the FIG. 1 communication system.

The system 600 includes a network processor 602 having an internal memory 604. The network processor 602 is coupled to an external memory 606 as shown, and is configured to provide an interface for communicating packets or other arrangements of data between a network 608 and a switch fabric 610. As noted previously, all such arrangements of data are intended to be encompassed by the general term "data block" as used herein. The network 608 may be a wireless network, corresponding to a portion of one of the wireless networks in the systems of FIGS. 1 and 2, while the network processor 602 and switch fabric 610 may be implemented in base stations, network controllers or other elements of such systems.

The network processor 602 and its associated external memory 606 may be implemented, e.g., as one or more integrated circuits installed on a line card or port card of a router, switch or other system element.

Figure 7:
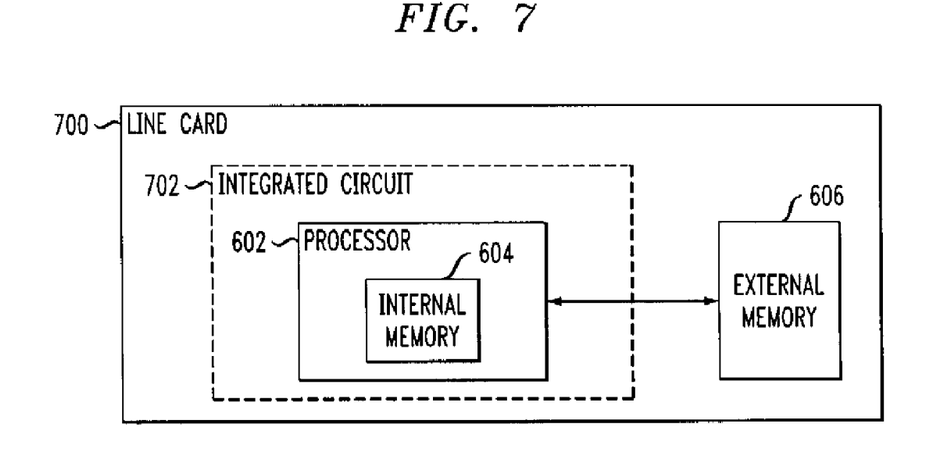
FIG. 7 is a block diagram of a network processor of the FIG. 6 system shown as an integrated circuit installed on a line card of a router or switch.

FIG. 7 illustrates an example line card embodiment of a portion of the system 600 of FIG. 6. In this embodiment, the system comprises a line card 700 having at least one integrated circuit 702 installed thereon. The integrated circuit 702 comprises network processor 602 which has internal memory 604. The network processor 602 interacts with external memory 606 on the line card 700. The external memory 606 may serve, e.g., as an external static random access memory (SRAM) or dynamic random access memory (DRAM) for the network processor integrated circuit 702. Such memories may be configured in a conventional manner. A suitable host processor may also be installed on the line card 700, and used for programming and otherwise controlling the operation of one or more network processor integrated circuits on the line card 700.

The portion of the communication system as shown in FIGS. 6 and 7 is considerably simplified for clarity of illustration. It is to be appreciated, however, that the system may comprise a router, switch or other element which includes multiple line cards such as that shown in FIG. 7, and that each of the line cards may include multiple integrated circuits. A similar embodiment may be implemented in the form of a port card. However, the invention does not require such card-based implementation in a router, switch or other element.

It should also be understood that the particular arrangements of elements shown in FIGS. 6 and 7 are by way of illustrative example only. More specifically, as previously noted, the invention can be implemented in any type of processor or other communication system processing device, and is not limited to any particular network-based processing application.

A "processor" as the term is used herein may be implemented, by way of example and without limitation, utilizing elements such as those commonly associated with a microprocessor, central processing unit (CPU), digital signal processor (DSP), application-specific integrated circuit (ASIC), or other type of data processing device, as well as portions and combinations of such elements.

Also, the system 600 and network processor 602 as illustrated in FIGS. 6 and 7 may include other elements in addition to or in place of those specifically shown, including one or more elements of a type commonly found in a conventional implementation of such a system and network processor. For example, the network processor may include a classifier, queuing and dispatch logic, one or more memory controllers, interface circuitry for interfacing the network processor with the network 608, the switch fabric 610, a host processor or other external device(s), as well as other conventional elements not explicitly shown in the figure. These and other conventional elements, being well understood by those skilled in the art, are not described in detail herein.

The functionality of the network processor 602 as described herein may be implemented at least in part in the form of software program code. For example, elements associated with the performance of scheduling operations in the network processor may be implemented at least in part utilizing elements that are programmable via instructions or other software that may be supplied to the network processor via an external host processor or other suitable mechanism. For example, information characterizing particular scheduling algorithms, or associated traffic shaping information, may be supplied to the network processor from the associated host processor or other suitable mechanism.

Figure 8:
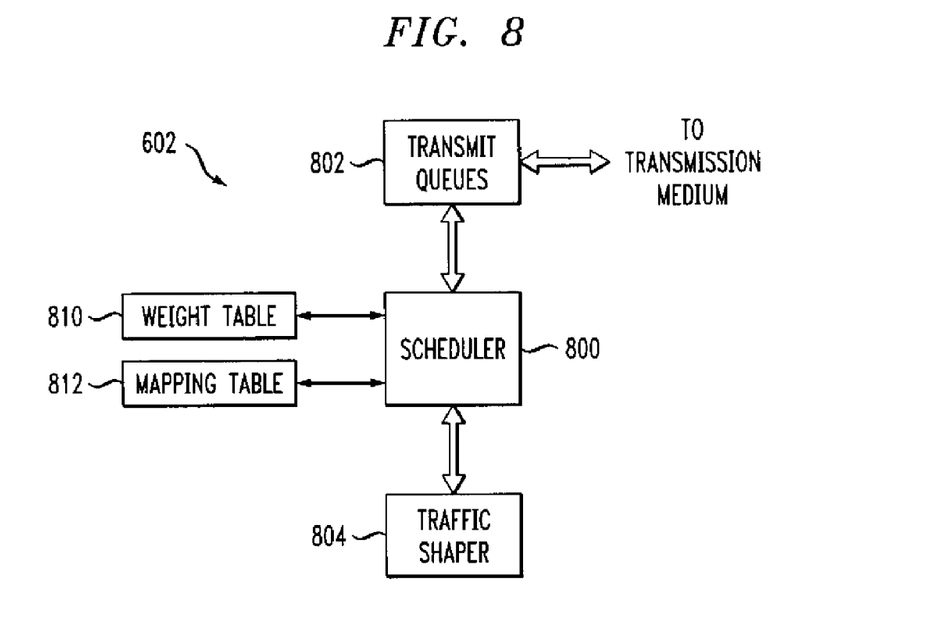
FIG. 8 is a more detailed view of a network processor of the FIG. 6 system configured in accordance with the techniques of the invention.

FIG. 8 shows a more detailed view of the network processor 602 in an illustrative embodiment of the invention. The network processor 602 in this embodiment includes a scheduler 800, transmit queues 802, a traffic shaper 804, a weight table 810, and a mapping table 812. In operation, the scheduler 800 schedules data blocks associated with the transmit queues 802 for transmission over one or more transmission media which are not explicitly shown. The scheduling utilizes the weight table 810 and mapping table 812, in conjunction with traffic shaping information from the traffic shaper 804 or without such information, in scheduling the data blocks associated with the transmit queues 802 for transmission.

As indicated previously, the network processor 602 may include additional elements, for example, of a type described in the above-cited U.S. patent applications, or of a conventional type known to those skilled in the art, and such elements, being described elsewhere, are not further described herein.

The weight table 810 and mapping table 812 may be stored at least in part in the internal memory 604 of the network processor 602, and may also or alternatively be stored at least in part in the external memory 606 of the network processor 602. When stored using internal memory, at least a portion of such memory may be internal to the scheduler 800 or other scheduling circuitry.

In addition to the table elements 810 and 812, scheduler 800 may include or otherwise have associated therewith a number of additional timeslot tables or other types of table elements suitable for use in static or dynamic table-based scheduling of a type described in the above-cited U.S. patent applications, or of a type known in conventional practice.

The transmit queues 802 may be viewed as comprising a plurality of transmission elements. For example, the transmit queues may comprise a plurality of transmission queues and associated control logic, with each of the transmission queues corresponding to a transmission element. It should be noted, however, that the term "transmission element" as used herein is intended to be construed more generally so as to encompass any source of one or more data blocks, or other elements that are schedulable for transmission in the network processor 602.

Packets or other data blocks can be enqueued in transmission elements of the transmit queues 802 from an associated network processor data path, not explicitly shown in the figure. This may occur in conjunction with packet enqueue messages and associated data blocks received from such a data path. Similarly, packets or other data blocks can be dequeued from the transmission elements to the data path upon transmission, for example, in conjunction with packet dequeue messages and associated data blocks being sent to the data path.

The traffic shaper 804 may be implemented, by way of example, as an otherwise conventional traffic shaping engine which establishes one or more traffic shaping requirements, in a known manner, for the transmission of the data blocks from the transmission elements of the transmit queues 802. The traffic shaper 804 may receive information regarding queue and scheduler status from the transmit queues 802 via the scheduler 800. The traffic shaper may generate traffic shaping information such as queue transmission interval and prioritization for establishing a class of service (CoS) or other desired service level for one or more of the transmission elements or their corresponding network connections.

As indicated above, in the network processor context the transmission elements, that is, the entities to be scheduled, may comprise queues. The present invention, however, can be used to schedule any type of elements for which data blocks are to be transmitted, and more generally any type of schedulable elements in a communication system processing device.

Such elements are intended to be encompassed by the general term "transmission elements" as used herein, and may also be referred to herein as "users."

The scheduler 800 in the FIG. 8 embodiment is configured to implement a scheduling algorithm such as the above-noted n-WiRR scheduling algorithm or its weighted version.

The schedulers 102 and 800 are illustrative examples of what is referred to more generally herein as "scheduling circuitry." In other embodiments, scheduling circuitry may include one or more tables or other arrangements of one or more of hardware, software and firmware capable of implementing the scheduling techniques described herein. Thus, although shown as separate from the scheduler 800 in the figure, the weight table 810 and the mapping table 812 or suitable portions thereof may be at least partially incorporated into scheduling circuitry or an associated memory in accordance with the invention.

The schedulers 102 and 800 may utilize any arrangement of logic gates, processing elements or other circuitry capable of providing scheduling functionality of the type described herein. Scheduling circuitry in accordance with the invention may thus comprise otherwise conventional general-purpose network processor circuitry which is adaptable under software control to provide at least a portion of a scheduling function in accordance with the invention. Numerous such circuitry arrangements will be readily apparent to those skilled in the art, and are therefore not described in detail herein.

As indicated above, a given embodiment of the present invention can be implemented as one or more integrated circuits. In such an arrangement, a plurality of identical die is typically formed in a repeated pattern on a surface of a wafer. Each die may include a device as described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Again, it should be emphasized that the above-described embodiments of the invention are intended to be illustrative only. For example, although the illustrative embodiment of FIG. 8 utilizes a scheduler which is separate from its associated table or tables, these elements or portions thereof may be incorporated into scheduling circuitry in accordance with the invention. Similarly, although transmit queues 802 and traffic shaper 804 are described as being separate from scheduler 800 in conjunction with the FIG. 8 embodiment, the associated functionality may be implemented at least in part within scheduling circuitry in accordance with the invention. Other embodiments can use different types and arrangements of processing elements for implementing the described functionality. For example, tables may be implemented in internal memory, external memory or combinations of internal and external memory. In the case of internal memory, at least a portion of such memory may be internal to the scheduling circuitry. A variety of different types of eligible number initialization based on integer n may be used, other than the particular examples shown in FIGS. 3 and 5. Also, a wide variety of different scheduling policies can be supported. These and numerous other alternative embodiments within the scope of the following claims will be apparent to those skilled in the art.

What is claimed is:

1. A method for scheduling data blocks for transmission from a plurality of transmission elements in timeslots of a frame in a communication system, the method comprising:
   determining eligible numbers for respective ones of the transmission elements that are eligible to transmit one or more data blocks in a given frame, wherein the eligible numbers are initialized using a common designated integer value n that is finite and greater than or equal to two;
   selecting from those of the transmission elements having eligible numbers within a particular range at least one of the transmission elements for scheduling in a next available timeslot;
   adjusting the eligible number(s) of the selected transmission element(s); and
   repeating the selecting and adjusting steps for one or more remaining timeslots of the given frame.

2. The method of claim 1 wherein the step of adjusting the eligible number(s) of the selected transmission element(s) further comprises decreasing the eligible number(s) of the selected transmission element(s) by a designated amount.

3. The method of claim 1 wherein the step of selecting at least one of the transmission elements for scheduling in a next available timeslot further comprises the step of selecting from those of the transmission elements having eligible numbers within the particular range at least one of the transmission elements having a highest channel capacity.

4. The method of claim 3 wherein the highest channel capacity comprises a highest absolute channel capacity.

5. The method of claim 3 wherein the highest channel capacity comprises a highest relative channel capacity.

6. The method of claim 1 wherein the step of determining the eligible numbers for respective ones of the transmission elements that are eligible to transmit one or more data blocks in the given frame further comprises setting each of the eligible numbers to the integer value n.

7. The method of claim 1 wherein the step of adjusting the eligible number(s) of the selected transmission element(s) further comprises decreasing the eligible number(s) of the selected transmission element(s) by one.

8. The method of claim 1 wherein the step of selecting from those of the transmission elements having eligible numbers within a particular range further comprises selecting from those of the transmission elements having positive eligible numbers.

9. The method of claim 1 wherein the step of determining the eligible numbers for respective ones of the transmission elements that are eligible to transmit one or more data blocks in the given frame further comprises setting the eligible numbers equal to respective products of the integer value n and respective assigned weights.

10. The method of claim 1 wherein the integer value n is less than or equal to ten.

11. The method of claim 10 wherein the integer value n is less than or equal to four.

12. The method of claim 1 further comprising the step of performing the determining, selecting, adjusting and repeating steps for at least one additional frame.

13. The method of claim 1 further including the step of adding a new transmission element to the plurality of transmission elements that are eligible to transmit one or more data blocks in the given frame.

14. An apparatus for scheduling data blocks for transmission from a plurality of transmission elements in timeslots of a frame in a communication system, the apparatus comprising:

a scheduler coupled to the transmission elements;

the scheduler being adapted to determine eligible numbers for respective ones of the transmission elements that are eligible to transmit one or more data blocks in a given frame, wherein the eligible numbers are initialized using a common designated integer value n that is finite and greater than or equal to two; to select from those of the transmission elements having eligible numbers within a particular range at least one of the transmission elements for scheduling in a next available timeslot; to adjust the eligible number(s) of the selected transmission element(s); and to repeat the selection and adjustment for one or more remaining timeslots of the given frame.

15. The apparatus of claim 14 wherein the scheduler comprises scheduling circuitry implemented in a processing device of the communication system.

16. The apparatus of claim 15 wherein the processing device comprises a network processor integrated circuit.

17. The apparatus of claim 14 wherein the eligible numbers for respective ones of the transmission elements that are eligible to transmit one or more data blocks in the given frame are initialized by setting each of the eligible numbers to the integer value n.

18. The apparatus of claim 14 wherein the eligible numbers for respective ones of the transmission elements that are eligible to transmit one or more data blocks in the given frame are initialized by setting the eligible numbers equal to respective products of the integer value n and respective assigned weights.

19. An integrated circuit comprising:

a processing device having a scheduler configured to schedule data blocks for transmission from a plurality of transmission elements in timeslots of a frame;

the scheduler being coupled to the transmission elements;

the scheduler being adapted to determine eligible numbers for respective ones of the transmission elements that are eligible to transmit one or more data blocks in a given frame, wherein the eligible numbers are initialized using a common designated integer value n that is finite and greater than or equal to two; to select from those of the transmission elements having eligible numbers within a particular range at least one of the transmission elements for scheduling in a next available timeslot; to adjust the eligible number(s) of the selected transmission element(s); and to repeat the selection and adjustment for one or more remaining timeslots of the given frame.

20. The integrated circuit of claim 19 wherein the processing device comprises a network processor.

* * * * *